(12) United States Patent
Dixon et al.

(10) Patent No.: US 10,408,171 B2
(45) Date of Patent: Sep. 10, 2019

(54) METHOD OF CLEANING AN EXHAUST GAS RECIRCULATION VALVE

(71) Applicant: Ford Global Technologies, LLC, Dearborn, MI (US)

(72) Inventors: Jon Dixon, Maldon (GB); Jim Bromham, Trowbridge (GB); Sean Gordon Harman, Southend on Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 15/796,541

(22) Filed: Oct. 27, 2017

(65) Prior Publication Data

US 2018/0119652 A1 May 3, 2018

(30) Foreign Application Priority Data

Oct. 27, 2016 (GB) .................................. 1618184.4

(51) Int. Cl.
*F02M 26/00* (2016.01)
*F02M 26/50* (2016.01)
(Continued)

(52) U.S. Cl.
CPC ......... *F02M 26/50* (2016.02); *F02D 41/0065* (2013.01); *F02D 41/0077* (2013.01);
(Continued)

(58) Field of Classification Search
CPC ... F02M 26/50; F02D 41/029; F02D 41/0077; F02D 41/405; F02D 41/26;
(Continued)

(56) References Cited

U.S. PATENT DOCUMENTS

| 7,155,899 B2 * | 1/2007 | Beer | ..................... F01N 3/2006 60/284 |
| 7,370,644 B2 * | 5/2008 | Wang | .................. F02B 29/0406 123/568.12 |

(Continued)

FOREIGN PATENT DOCUMENTS

| CN | 103867571 A | 6/2014 |
| CN | 104863731 A | 8/2015 |

(Continued)

OTHER PUBLICATIONS

Intellectual Property Office of the United Kingdom, Combined Search and Examination Report Issued in Application No. GB1618184.4, dated Apr. 7, 2017, 5 pages.

*Primary Examiner* — Hieu T Vo
*Assistant Examiner* — Sherman D Manley
(74) *Attorney, Agent, or Firm* — Julia Voutyras; McCoy Russell LLP

(57) ABSTRACT

A method of cleaning an EGR valve operatively connected to an exhaust flow from an engine includes determining when cleaning is required, and when cleaning is required, operating the engine in a high temperature mode in which the temperature of exhaust gas exiting the engine is increased while producing a flow of exhaust gas having a low unburnt hydrocarbon content. The method further includes opening the EGR valve to allow hot exhaust gas to flow therethrough so as to remove combustion by-products that are fouling the EGR valve. Furthermore, the method includes producing an estimate of accumulated combustion by-product fouling of the EGR valve. The estimate is then used to determine whether and when to clean the EGR valve.

26 Claims, 6 Drawing Sheets

(51) Int. Cl.
  *F02D 41/00* (2006.01)
  *F02D 41/24* (2006.01)
  *F02D 41/26* (2006.01)
  *F02D 41/02* (2006.01)
  *F02D 41/40* (2006.01)

(52) U.S. Cl.
  CPC ....... *F02D 41/029* (2013.01); *F02D 41/2422* (2013.01); *F02D 41/26* (2013.01); *F02D 41/405* (2013.01); *F02D 2200/021* (2013.01); *Y02T 10/44* (2013.01); *Y02T 10/47* (2013.01)

(58) Field of Classification Search
  CPC ............. F02D 41/0065; F02D 41/2422; F02D 2200/021; Y02T 10/47; Y02T 10/44
  See application file for complete search history.

(56) References Cited

U.S. PATENT DOCUMENTS

| | | | | |
|---|---|---|---|---|
| 8,272,362 | B2* | 9/2012 | Shane | F02D 41/0002 123/299 |
| 2004/0012318 | A1* | 1/2004 | Ishikawa | H01T 13/32 313/141 |
| 2008/0017175 | A1* | 1/2008 | Kondo | F02B 29/0425 123/568.19 |
| 2009/0133391 | A1* | 5/2009 | Porten | F01N 3/0842 60/303 |
| 2011/0166768 | A1* | 7/2011 | Yamaoka | F02D 41/0245 701/103 |
| 2016/0348598 | A1* | 12/2016 | Dixon | F02M 26/73 |

FOREIGN PATENT DOCUMENTS

| | | |
|---|---|---|
| FR | 2833653 A1 | 6/2003 |
| FR | 2983253 A1 | 5/2013 |
| JP | S5762954 A | 4/1982 |
| JP | 2000186631 A | 7/2000 |
| JP | 2009057849 A | 3/2009 |
| JP | 2013256918 A | 12/2013 |
| KR | 20160049697 A | 5/2016 |
| WO | 2009156670 A1 | 12/2009 |

\* cited by examiner

METHOD OF CLEANING AN EXHAUST GAS RECIRCULATION VALVE

CROSS REFERENCE TO RELATED APPLICATION

The present application claims priority to Great Britain Patent Application No. 1618184.4, filed Oct. 27, 2016. The entire contents of the above-referenced application are hereby incorporated by reference in its entirety for all purposes.

BACKGROUND/SUMMARY

The present disclosure relates to combustion engines and in particular to a method of cleaning an exhaust gas recirculation valve (EGR valve) of an engine system.

It is well known to provide a combustion engine with an exhaust gas recirculation system in which exhaust gas is recirculated back from an exhaust side of the engine to an air inlet side of the engine.

Such exhaust gas recirculation systems include a valve referred to as an EGR valve to control the flow of exhaust gas flowing back to the inlet side of the engine.

Such EGR valves normally have a poppet type valve having a valve element comprised of a valve head and valve stem with the valve head being connected to a valve actuator via the valve stem and the valve head co-operating with a valve seat when in a closed position.

Current EGR systems operate at low ambient temperatures, but not when the engine is very cold due to the risk of fouling and sticking of the EGR valve. Using current practice the main contamination that builds up on the EGR valve is a mix of dry soot produced at exhaust gas temperatures of circa 150 to 250° C. and lacquer produced at exhaust gas temperatures of circa 80 to 150° C. Current practice to clean the EGR valve is to cycle the EGR valve repeatedly through its range of movement from fully open to fully closed and back. This action "scrapes" any deposit accumulation on the valve stem.

However, because opening the EGR valve fully causes a very high rate of EGR to flow if used during normal engine running, the cleaning cycle is only be performed with the engine off, typically at the end of a drive cycle.

Forthcoming exhaust emission regulations particularly for diesel engines will require the operation of EGR systems at conditions where they have not previously been used and, in particular, at low ambient temperatures with cold engine coolant, that is to say, during an engine warm-up period following a cold start when the exhaust gas temperature is below 80° C.

Opening the EGR valve in such cold conditions when the exhaust gas and the EGR valve are both relatively cold will cause sticky hydrocarbons to condense out of the exhaust gas and accumulate on the valve. Such fouling of the EGR valve is undesirable as it will often cause unreliable operation of the EGR valve such as valve sticking in which the EGR valve will get stuck in a partially open condition when the desired operational position is closed or will get stuck open when a closed position is required.

Such valve sticking will result in a reduction in emission performance and potential poor engine running.

The current cleaning procedure that is effective for removing lacquer and dry soot generated during current EGR operating regimes will no longer be adequate to remove the sticky residue that is produced when using EGR operation in such cold conditions and a new cleaning process is required.

It is an object of the present disclosure to provide a method of cleaning an EGR valve that is able to effectively remove the sticky residue produced by cold EGR operation before the build-up of such residue adversely affects EGR valve operation.

According to a first aspect of the present disclosure there is provided a method of cleaning an exhaust gas recirculation valve forming part of an engine system having an engine arranged to supply exhaust gas to a particulate filter, an exhaust gas recirculation circuit including the exhaust gas recirculation valve to selectively recirculate exhaust gas back from an exhaust side of the engine to an air inlet side of the engine, and an electronic controller to control the operation of the engine system, wherein the method comprises producing an estimate of accumulated combustion by-product fouling of the exhaust gas recirculation valve, comparing the estimate of combustion by-product fouling to a predefined fouling limit and, if the estimate of combustion by-product fouling is greater than the predefined fouling limit, operating the engine to increase a temperature of the exhaust gas from the engine while producing a flow of exhaust gas having a an unburnt hydrocarbon content below a threshold, and controlling the exhaust gas recirculation valve during a cleaning period to allow the exhaust gas from the engine to flow through the exhaust gas recirculation valve thereby reducing a quantity of combustion by-products accumulated at the exhaust gas recirculation valve.

This has the advantage that sticky hydrocarbon residue and other fouling of the EGR valve are burnt-off.

There may be lower and upper predefined fouling limits and the lower limit may be a fouling limit above which cleaning of the exhaust gas recirculation valve is used to reduce the probability of unreliable operation of the exhaust gas recirculation valve. Accordingly, the method may further comprise, responsive to the estimate of combustion by-product fouling exceeding the lower limit, adjusting operation of the engine system to clean the exhaust gas recirculation valve in order to reduce the probability of unreliable operation of the exhaust gas recirculation valve.

If the estimate of combustion by-product fouling is greater than the upper fouling limit then the engine may be immediately operated to increase the temperature of the exhaust gas from the engine while producing a flow of hot exhaust gas having a low unburnt hydrocarbon content and the exhaust gas recirculation valve may be controlled to allow hot exhaust gas from the engine to flow through the exhaust gas recirculation valve. Accordingly, the method may further comprise operating the engine system in a first mode in which the estimate of combustion by-product fouling is greater than the upper limit, and during operation in the first mode, adjusting operation of the engine system to increase the temperature of the exhaust gas from the engine and produce a flow of exhaust gas having an unburnt hydrocarbon content below the threshold, and at least partially opening the exhaust gas recirculation valve to allow exhaust gas from the engine to flow through the exhaust gas recirculation valve.

If the estimate of combustion by-product fouling is greater than the lower fouling limit but lower than the higher fouling limit then operation of the engine to increase the temperature of the exhaust gas from the engine while producing a flow of hot exhaust gas having a low unburnt hydrocarbon content may be delayed until a particulate filter regeneration event commences and when the particulate filter regeneration event commences the exhaust gas recirculation valve may be controlled to allow hot exhaust gas from the engine to flow through the exhaust gas recirculation valve. Accordingly, the method may further comprise operating the engine system in a second mode in which the estimate of combustion by-product fouling is greater than the lower limit but less than the upper limit, and during operation in the second mode, waiting until a particulate filter regeneration event commences, and then adjusting operation of the engine system to increase the temperature of the exhaust gas from the engine while producing a flow of exhaust gas having an unburnt hydrocarbon content lower than the threshold, and controlling the exhaust gas recirculation valve to allow the exhaust gas from the engine to flow through the exhaust gas recirculation valve.

This has the advantage that no additional fuel is required to clean the EGR valve.

The exhaust gas recirculation valve may be closed if one of the flow of hot exhaust gas having a low unburnt hydrocarbon content ceases, an updated estimate of the accumulated combustion by-product fouling of the exhaust gas recirculation valve indicates that the level of fouling is below a predefined fouling threshold and an EGR valve maximum permitted temperature threshold is reached.

The predefined fouling threshold may be a level of fouling at which the quantity of combustion by-products accumulated at the exhaust gas recirculation valve is substantially equal to zero.

The estimate of accumulated combustion by-product fouling of the exhaust gas recirculation valve may be an integral of a rate of fouling of the exhaust gas recirculation valve over time.

The rate of fouling of the exhaust gas recirculation valve may be based upon a combination of a relationship between exhaust gas mass flow through the exhaust gas recirculation valve and temperature of the exhaust gas flowing through the exhaust gas recirculation valve and a relationship between ambient air temperature and engine coolant temperature during the time period that exhaust gas is flowing through the exhaust gas recirculation valve.

The relationship between exhaust gas mass flow through the exhaust gas recirculation time and temperature of the exhaust gas flowing through the exhaust gas recirculation valve may be provided by way of a look up table and the relationship between ambient air temperature and engine coolant temperature during the time period that exhaust gas is flowing through the exhaust gas recirculation valve may be provided by way of a look up table.

Controlling the exhaust gas recirculation valve during a cleaning period may comprise producing an exhaust gas recirculation valve position based upon a relationship between exhaust gas mass flow through the exhaust gas recirculation valve during the cleaning period and a pressure difference across the exhaust gas recirculation valve.

The relationship between exhaust gas mass flow through the exhaust gas recirculation valve during the cleaning period and a pressure difference across the exhaust gas recirculation valve may be provided by way of a look up table.

The exhaust gas mass flow through the exhaust gas recirculation valve during the cleaning period may be based upon a combination of a relationship between the temperature of the exhaust gas flowing through the exhaust gas recirculation valve and engine coolant temperature and a relationship between time and exhaust gas recirculation valve temperature during the cleaning period.

The relationship between the temperature of the exhaust gas flowing through the exhaust gas recirculation valve and engine coolant temperature may be provided by way of a look up table.

The relationship between time and exhaust gas recirculation valve temperature during the cleaning period may be provided by way of a look up table.

The engine may be a diesel engine and the particulate filter may be a diesel particulate filter.

According to a second aspect of the present disclosure there is provided an engine system comprising an engine arranged to supply exhaust gas to a particulate filter, an exhaust gas recirculation circuit including an exhaust gas recirculation valve to selectively recirculate exhaust gas from an exhaust outlet side of the engine to an air inlet side of the engine and an electronic controller to control the operation of the engine and the exhaust gas recirculation valve wherein the electronic controller includes instructions stored in non-transitory memory which are executable by a processor to produce an estimate of accumulated combustion by-product fouling of the exhaust gas recirculation valve based upon inputs received from a number of sensors, compare the estimated combustion by-product fouling to a predefined fouling limit stored in the non-transitory memory of the electronic controller and if the comparison indicates that the estimate of combustion by-product fouling is greater than the predefined limit the electronic controller is arranged to clean the exhaust gas recirculation valve by operating the engine to increase the temperature of the exhaust gas from the engine while producing a flow of exhaust gas having a low unburnt hydrocarbon content and to control the exhaust gas recirculation valve during a cleaning period to allow hot exhaust gas from the engine to flow through the exhaust gas recirculation valve thereby reducing the quantity of combustion by-products accumulated at the exhaust gas recirculation valve.

There may be lower and upper predefined fouling limits and the lower limit may be a fouling limit above which cleaning of the exhaust gas recirculation valve is used in order to reduce the probability of unreliable operation of the exhaust gas recirculation valve.

If the estimate of combustion by-product fouling is greater than the upper fouling limit then the electronic controller may be arranged to operate the engine to immediately increase the temperature of the exhaust gas from the engine while producing a flow of hot exhaust gas having a low unburnt hydrocarbon content and is further arranged to control the exhaust gas recirculation valve to allow hot exhaust gas from the engine to flow through the exhaust gas recirculation valve. For example, the electronic controller may further comprise instructions stored in the non-transitory memory and executable by the processor to operate the engine system in a first mode in which the estimate of combustion by-product fouling is greater than the upper limit, and during operation in the first mode, adjust operation of the engine system to then the electronic controller is arranged to operate the engine to immediately increase the temperature of the exhaust gas from the engine and produce a flow of exhaust gas having an unburnt hydrocarbon content below the threshold, and control the exhaust gas recirculation valve to allow exhaust gas from the engine to flow through the exhaust gas recirculation valve.

If the estimate of combustion by-product fouling is greater than the lower fouling limit but lower than the upper fouling limit then the electronic controller may be arranged to delay operating the engine to increase the temperature of the exhaust gas from the engine while producing a flow of hot exhaust gas having a low unburnt hydrocarbon content until a particulate filter regeneration event commences and when the particulate filter regeneration event commences the electronic controller is arranged to open the exhaust gas recirculation valve to allow hot exhaust gas from the engine to flow through the exhaust gas recirculation valve. For example, the electronic controller may further comprises instructions stored in the non-transitory memory and executable by the processor to operate the engine system in a second mode in which the estimate of combustion by-product fouling is greater than the lower limit but lower than the upper limit, and during operation in the second mode, wait until a particulate filter regeneration event commences, and then adjust operation of the engine system to increase the temperature of the exhaust gas from the engine while producing a flow of exhaust gas having an unburnt hydrocarbon content lower than the threshold, until a particulate filter regeneration event commences, and when the particulate filter regeneration event commences, at least partially open the exhaust gas recirculation valve to allow exhaust gas from the engine to flow through the exhaust gas recirculation valve.

The exhaust gas recirculation valve may be closed if one of the flow of hot exhaust gas having a low unburnt hydrocarbon content ceases, an updated estimate of the accumulated combustion by-product fouling of the exhaust gas recirculation valve indicates that the level of fouling is below a predefined fouling threshold and an EGR valve maximum permitted temperature threshold is reached.

The predefined threshold may be a level of fouling substantially equal to zero.

The estimate of accumulated combustion by-product fouling of the exhaust gas recirculation valve may be an integral of a rate of fouling of the exhaust gas recirculation valve over time.

Controlling the exhaust gas recirculation valve during a cleaning period may comprise producing an exhaust gas recirculation valve position based upon a relationship between exhaust gas mass flow through the exhaust gas recirculation valve during the cleaning period and a pressure difference across the exhaust gas recirculation valve.

The relationship between exhaust gas mass flow through the exhaust gas recirculation valve during the cleaning period and a pressure difference across the exhaust gas recirculation valve may be provided by way of a look up table stored in a memory of the electronic controller.

The engine may be a diesel engine and the particulate filter may be a diesel particulate filter.

According to a third aspect of the present disclosure there is provided a motor vehicle having an engine system wherein the engine system is an engine system constructed in accordance with said second aspect of the present disclosure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The various embodiments of the present disclosure now be described by way of example with reference to the accompanying drawing of which.

DETAILED DESCRIPTION OF THE FIGURES

Figure 1:
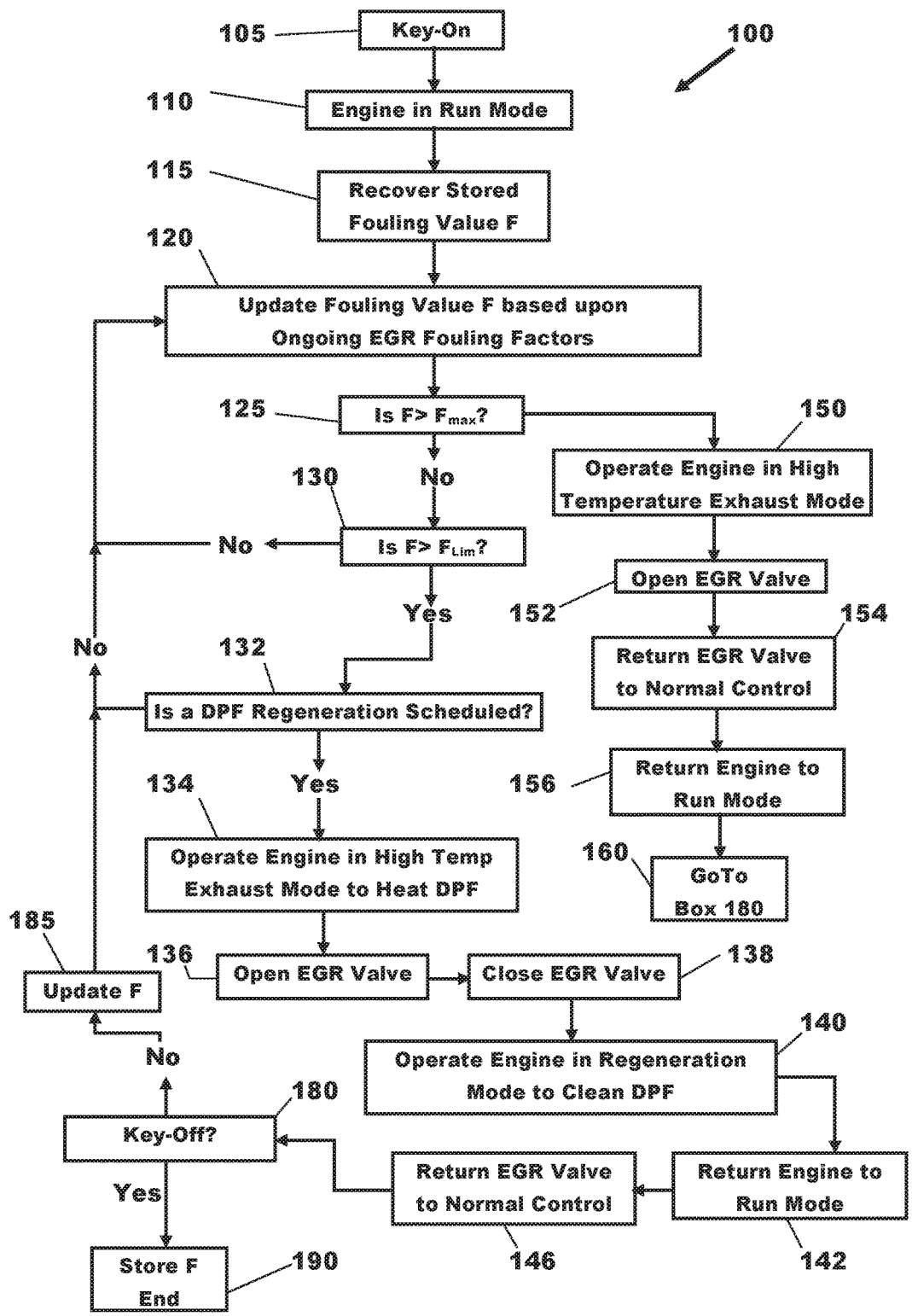
FIG. 1 is a high level flow chart showing a method of cleaning an exhaust gas recirculation valve in accordance with a first aspect of the present disclosure.

With reference to FIG. 1 there is shown one embodiment of a method 100 of cleaning an exhaust gas recirculation valve of an engine-driven vehicle in accordance with the present disclosure. Instructions for carrying out method 100 and the rest of the methods included herein may be executed by an electronic controller based on instructions stored in non-transitory memory of the electronic controller and in conjunction with signals received from sensors of the engine system, such as the sensors described below with reference to FIG. 2. Further, the electronic controller may employ actuators of the engine system, such as the actuators described below with reference to FIG. 2, to adjust engine operation, according to the methods described below.

The method 100 starts in box 105 with a Key-On event and then progresses to box 110 where an engine of the vehicle is running normally that is to say it is in a 'Run mode' of operation. In the run mode of operation the engine is operated to run as efficiently as possible while producing low exhaust gas emissions (e.g., exhaust gas emissions below a predefined threshold) in response to a driver demand for torque.

Then in box 115 a stored value of an EGR valve fouling factor 'F' is recovered from a memory device or the like (e.g., non-transitory memory of an electronic controller). The fouling factor 'F' is a value indicative of the estimated accumulated combustion by-product fouling of the EGR valve (e.g., the estimated quantity of combustion by-products accumulated at the EGR valve) at that point in time and, as is described in greater detail hereinafter, is an integral of the rate of fouling of the EGR valve (e.g., the rate at which combustion by-products accumulate on the EGR valve) over time. It will be appreciated that the activity of recovering a stored value of 'F' indicated in box 115 will in practice normally occur more or less at the same time as when the Key-on step indicated in box 105 occurs.

The rate of fouling of the exhaust gas recirculation valve is based upon a combination of a relationship between exhaust gas mass flow through the exhaust gas recirculation valve and temperature of the exhaust gas flowing through the exhaust gas recirculation valve and a relationship between ambient air temperature and engine coolant temperature during the time period that exhaust gas is flowing through the exhaust gas recirculation valve.

The relationship between exhaust gas mass flow through the exhaust gas recirculation valve and temperature of the exhaust gas flowing through the exhaust gas recirculation valve can be provided by way of a look up table. Similarly, the relationship between ambient air temperature and engine coolant temperature during the time period that exhaust gas is flowing through the exhaust gas recirculation valve can be provided by way of a look up table. The look up tables may be stored in non-transitory memory of an electronic controller.

Moving on from box 115 to box 120 the value of fouling factor 'F' is continually updated based upon an ongoing estimate of fouling of the EGR valve based upon a number of factors known to produce EGR valve fouling. The estimate may be determined via estimation performed by an electronic controller at predefined intervals, for example. The presence of the factors known to produce EGR valve fouling may be determined at the electronic controller, e.g. based on inputs from one or more sensors.

The value of 'F' is then checked in box 125 against a predefined maximum permitted value '$F_{max}$' that represents a value of fouling above which unreliable operation of the EGR valve is likely to occur. If the level of EGR valve fouling has reached the $F_{max}$ level then immediate action is required to clean the EGR valve in order to prevent unreliable operation of the EGR valve.

Normally the level of the fouling factor 'F' when checked in box 125 will be less than $F_{max}$ because the EGR valve is regularly cleaned in a preventive manner to ensure that unreliable operation is so far as possible avoided. However, as discussed hereinafter, it may be advantageous to execute EGR valve cleaning during an initial phase (Phase 1) of a diesel particulate filter (DPF) regeneration process because the inefficient running of the engine required for such a regeneration process produces a hot (e.g., hotter than a threshold) but relatively clean, low unburnt hydrocarbon flow of exhaust gas from the engine. However, there are vehicle operating circumstances in which the rate of EGR valve fouling is very high but a regeneration of the DPF is not scheduled or cannot take place thereby allowing the fouling to reach the $F_{max}$ limit.

Therefore in such an eventuality the method will advance from box 125 to box 150 where the engine is operated in a high temperature exhaust mode that is the same as or very similar to that used for Phase 1 of a DPF regeneration, that is to say, it will produce a hot but relatively clean, low unburnt hydrocarbon flow of exhaust gas from the engine. In this mode of operation the engine is run inefficiently by injecting fuel into the engine slightly after the optimum timing position such that combustion is not efficiently used to produce power but instead produces a rapid rise in the temperature of the exhaust gas exiting the engine. The injection of fuel is not so late as to produce a significant flow of unburnt fuel in the exhaust stream as in the case with the late injection or post injection process used for Phase 2 of a DPF regeneration process in which there is a significant mass of unburnt hydrocarbons in the exhaust flow from the engine. As will be appreciated by those skilled in the art, an optimum timing position for fuel injection may refer to a fuel injection timing, relative to the piston position/engine stroke, which will produce desired engine operation (e.g., a demanded engine torque output/desired engine air-fuel ratio/desired exhaust emissions level).

Then from box 150 the method advances to box 152 where the EGR valve is at least partially opened in a controlled manner in order to allow the very hot exhaust gas (circa 400 to 500° C.) to flow through the EGR valve thereby burning off the sticky residue that has built up on the valve element and in particular on the valve stem of the valve element. It will be appreciated that the flow of gas through the EGR valve needs to be carefully controlled in order to prevent damage occurring to parts of the EGR valve that are not resistant to high temperatures such as, for example, the actuator, seals or plastic components of the EGR valve and cleaning of the EGR valve will be terminated if the temperature of a predefined component of the EGR valve such as a plastic actuator body reaches maximum permitted temperature threshold such as, for example, 150° C.

Therefore to prevent overheating of the EGR valve during cleaning the flow of exhaust gas through the EGR valve is controlled by producing an exhaust gas recirculation valve position based upon a relationship between exhaust gas mass flow through the exhaust gas recirculation valve during the cleaning period and a pressure difference across the exhaust gas recirculation valve. The relationship between exhaust gas mass flow through the exhaust gas recirculation valve during the cleaning period and a pressure difference across the exhaust gas recirculation valve can be provided by way of a look up table.

The exhaust gas mass flow through the exhaust gas recirculation valve during the cleaning period can be based upon a combination of a relationship between the temperature of the exhaust gas flowing through the exhaust gas recirculation valve and engine coolant temperature and a relationship between time and exhaust gas recirculation valve temperature during the cleaning period. The relationship between the temperature of the exhaust gas flowing through the exhaust gas recirculation valve and engine coolant temperature and the relationship between time and exhaust gas recirculation valve temperature during the cleaning period can both be provided by way of respective look up tables.

It will be appreciated that when the EGR valve is first opened a larger flow of exhaust gas may be permitted to flow than later in the cleaning process when the temperature of the EGR valve will have risen due to the flow of exhaust gas therethrough. Eventually, the maximum permitted flow of exhaust gas will fall to a value substantially equal to zero, at which point the method advances to box 154 with the EGR valve closed and control of the EGR valve restored to normal control to meet emission needs. Further, as indicated in box 156, operation of the engine is restored to a normal run mode in which the engine is operated as efficiently as possible to meet a current torque demand, and the temperature of the exhaust gas will drop back to a normal, lower running temperature.

The method will move from box 152 to box 154 when at least one of the flow of hot exhaust gas having a low unburnt hydrocarbon content from the engine ceases, an updated estimate of the accumulated combustion by-product fouling of the exhaust gas recirculation valve indicates that the level of fouling (e.g., the quantity of combustion by-products accumulated at the EGR valve) is below a predefined fouling threshold which indicates that the EGR valve is clean, and an EGR valve maximum permitted temperature threshold is reached.

In box 154 control of the opening and closing of the EGR valve is performed in a normal manner to meet current emission needs, and in box 156 control of the engine is restored to the normal run mode to meet current torque needs. As used herein, "normal" control of the EGR valve refers to a default EGR valve control strategy in which the EGR valve position is adjusted based on desired engine air-fuel ratio and/or torque output, as opposed to the control strategy of the EGR valve described herein which is used in conjunction with other adjustments to operation of the engine system in order to clean the EGR valve (e.g., the control strategy used during the "cleaning" period/mode/cycle/operation described herein). Similarly, the "normal" run mode of the engine refers to an operating mode of the engine in which engine operation is adjusted based on a desired engine air-fuel ratio and/or torque output, as opposed to the control strategy of the engine described herein which is used in conjunction with adjustments to other engine system components in order to clean the EGR valve.

Then from box 156 the method advances to box 160 and then to box 180 where it is checked whether a Key-Off event has occurred. If a Key-Off event has occurred then the method advances to box 190 where the value of 'F' is stored in a memory or like device (e.g., non-transitory memory of an electronic controller) and the method ends. If there is not a Key-Off event when checked in box 180 then the method advances to box 185 where the value of the fouling factor 'F' is updated to take into account the cleaning operation which will have reduced the mass of accumulated combustion by-product sticking to the EGR valve to substantially zero and then the method returns to box 120.

It will be appreciated that after a cleaning cycle the value of 'F' will likely approach zero but this will depend upon whether the cleaning of the EGR valve was able to be completed before the need to close the EGR valve to prevent temperature-induced damage was reached. It will further be appreciated that a Key-Off event can occur at any time and that whenever such an event occurs the current value of the fouling factor 'F' is saved as part of the Key-Off process.

Returning to box 125, if, as is normally the case, the value of the fouling factor 'F' is less than $F_{max}$, then the method advances from box 125 to box 130.

The value of the fouling factor 'F' is checked in box 130 against a predefined limiting value '$F_{Lim}$' that represents a value of fouling above which unreliable operation of the EGR valve could occur thereby indicating that cleaning of the EGR valve is desirable.

Normally the level of the fouling factor 'F' when checked in box 130 will be less than $F_{Lim}$ because the EGR valve is regularly cleaned in a preventive manner and so the method will then loop back to box 120 to continue with the monitoring of EGR valve fouling. However over time fouling of the EGR valve will increase and so eventually the value of 'F' will exceed the limit $F_{Lim}$ set for EGR valve fouling, and the method then advances to box 132 where it is checked whether a DPF regeneration event is scheduled. This will depend upon the loading of the DPF and as is well known in the art there are various techniques and strategies employed to decide when to carry out a DPF regeneration. If a DPF regeneration is not scheduled then the method will return to box 120 and, if the steps 120, 125, 130 and 132 are executed a large number of times without obtaining a positive result in box 132, this is one scenario when a positive result in box 125 likely to eventually result.

Referring back to box 132 if there is a positive result indicating that regeneration of the DPF is scheduled to occur at the next opportunity then the method advances, after a delay to wait for regeneration to commence, from box 132 to box 134.

In box 134, when the conditions for DPF regeneration entry are met, the engine is operated in a high temperature exhaust mode used for Phase 1 heating of the DPF regeneration. In this high temperature mode of engine operation the engine is run inefficiently by injecting fuel into the engine slightly after the optimum timing position such that combustion is not efficiently used to produce power but instead produces a rapid rise in the temperature of the exhaust gas exiting the engine. The injection of fuel is not so late as to produce a significant flow of unburnt fuel in the exhaust stream as in the case with the late injection or post injection process used for Phase 2 of the DPF regeneration process. It will be appreciated that Phase 1 of the DPF regeneration process is used to increase the temperature of the DPF in preparation for regeneration.

Then from box 134 the method advances to box 136 where the EGR valve is at least partially opened in a controlled manner in order to allow the very hot exhaust gas (circa 400 to 500° C.) to flow through the EGR valve thereby burning off the sticky residue that has built up on the valve element and in particular on the valve stem of the valve element. It will be appreciated that the flow of gas through the EGR valve needs to be carefully controlled in order to prevent damage occurring to parts of the EGR valve that are not resistant to high temperatures such as, for example, the actuator, seals or plastic components of the EGR valve.

As before, the maximum flow of exhaust gas through the EGR valve is controlled as a function of the exhaust gas temperature, the engine coolant temperature, and the time that has elapsed since the high temperature exhaust mode was entered. As before, the flow of exhaust gas will normally start high and gradually be reduced by closing the EGR valve, until later in the cleaning process the temperature of the EGR valve will have risen such that the maximum permitted flow of exhaust gas has reduced to a value substantially equal to zero, at which point the method advances to box 138 where the EGR valve is closed.

The method will move from box 136 to box 138 when at least one of the flow of hot exhaust gas having a low unburnt hydrocarbon content from the engine ceases, an updated estimate of the accumulated combustion by-product fouling of the exhaust gas recirculation valve indicates that the level of fouling (e.g., the quantity of combustion by-product accumulated on the EGR valve) is below a predefined fouling threshold (F~0), that is say, the EGR valve is clean and an EGR valve maximum permitted temperature threshold is reached, and then onto box 140 which represents Phase 2 of the DPF regeneration process. It will be appreciated that the EGR valve should be closed before the Phase 2 regeneration commences because there is a high level of excess hydrocarbons in the exhaust gas during Phase 2 regeneration that would produce a high rate of fouling of the EGR valve.

In Phase 2 of the DPF regeneration process one or more late or post injections of fuel (e.g., injections of fuel occurring after combustion occurs and prior to a subsequent combustion) are made to the engine resulting in unburnt fuel flowing to the DPF which has already been heated by the Phase 1 process and so will result in combustion of the unburnt fuel in the DPF. This combustion results in the soot stored in the DPF auto-combusting thereby regenerating the DPF. As referred to above, during the Phase 2 regeneration process, the EGR valve is kept closed at all times to prevent fuel enriched exhaust gas from fouling the EGR valve.

When the DPF has been regenerated the method advances from box 140 to box 142 where operation of the engine is restored to the normal run mode so as to be operated as efficiently as possible to meet a current torque demand and the temperature of the exhaust gas will drop to a normal lower running temperature, and then advances to box 146 where control of the EGR valve is restored to normal control to meet emission needs, and then advances to box 180.

In box 180 it is checked whether a Key-Off event has occurred. If a Key-Off event has occurred then the method advances to box 190 where the value of 'F' is stored in a memory or like device and the method ends. If when checked in box 180 there is not a Key-Off event then the method advances to box 185 where the value of 'F' is updated to take into account the cleaning operation and then the method returns to box 120.

Therefore in summary, whenever possible the cleaning of the EGR valve is arranged to coincide with a heating Phase 1 for a DPF regeneration because any inefficient running of the engine required to increase exhaust gas temperature is minimised by using the same hot exhaust gas flow from the engine to clean the EGR valve as is used to heat the DPF. It is only when cleaning of the EGR valve becomes critical and a DPF regeneration is not scheduled that the engine is operated in a hot exhaust mode purely for EGR valve cleaning purposes.

Figure 2:
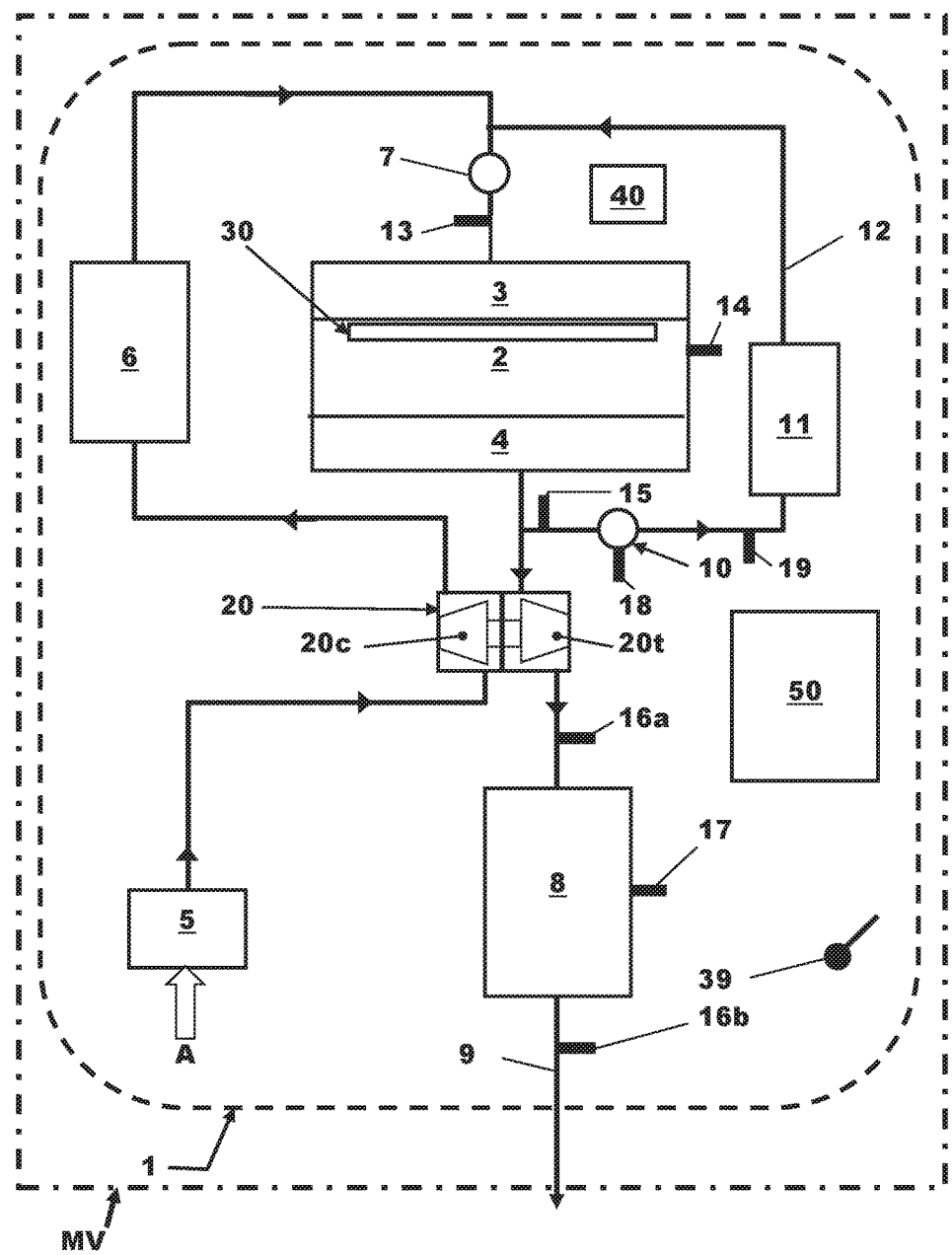
FIG. 2 is a schematic representation of an engine system having an exhaust gas recirculation system including an EGR valve in accordance with a second aspect of the present disclosure.

With reference to FIG. 2 there is shown a motor vehicle 'MV' having an engine system 1.

The engine system 1 comprises in the case of this example a diesel engine 2 having an inlet manifold 3 and an exhaust manifold 4, an air filter 5, an intercooler 6, a throttle valve 7, a particulate trap in the form of a diesel particulate filter (DPF 8), an exhaust pipe 9, an exhaust gas recirculation valve 10, an exhaust gas cooler 11, a turbocharger 20, a number of fuel injectors 30, an electronic controller 50 and a number of sensors 13, 14, 15, 16*a*, 16*b*, 17, 18, 19, 39 and 40 operatively connected to the electronic controller 50. Electronic controller 50 receives signals from sensors of the engine system (e.g., the sensors shown in FIG. 2), and employs the various actuators of the engine system (e.g., the actuators shown in FIG. 2) to adjust engine system operation based on the received signals and instructions stored in non-transitory memory of the electronic controller.

Ambient air enters via the air filter 5 as indicated by the arrow A and flows via an inlet air passage to an inlet of a compressor 20*c* of the turbocharger 20. The air is compressed by the compressor 20*c* and flows via the intercooler 6 and an air inlet flow passage to the throttle valve 7 and from there to the inlet manifold 3 on an inlet side of the engine 2. The throttle valve 7 is in the case of this example controlled by the electronic controller 50 in response to an input from the accelerator pedal position sensor 39 indicative of a required driver torque demand.

Exhaust gas flows out from the exhaust manifold 4 on an exhaust side of the engine 2 to an inlet of a turbine 20*t* of the turbocharger via an exhaust gas flow passage and flows from an outlet of the turbine 20*t* to the DPF 8 and then via the exhaust pipe 9 to atmosphere. It will be appreciated that other aftertreatment devices and noise reduction devices (not shown) can be included as part of the exhaust gas flow path from the engine 2 to atmosphere.

An exhaust gas recirculation circuit is arranged to connect the exhaust flow from the engine 2 at a position upstream from the turbine 20*t* to a position in the air inlet flow passage upstream from the throttle valve 7.

The exhaust gas recirculation circuit includes in the case of this example the EGR valve 10 and the exhaust gas cooler 11. It will be appreciated that in some embodiments no exhaust gas cooler may be present. Irrespective of the arrangement of the exhaust gas circuit the EGR valve 10 is arranged to be directly exposed to the exhaust gas flow from the engine 2. That is to say, if an exhaust gas cooler such as the exhaust gas cooler 11 is present in the exhaust gas recirculation circuit then it is located downstream from the EGR valve 10 so that the EGR valve 10 is always directly exposed to the hot exhaust gas from the engine 2.

The mass of air entering the engine 2 is sensed via a mass air flow (MAF) sensor 13, the temperature of the coolant for the engine 2 is sensed via a coolant temperature sensor 14, the temperature of the ambient air is sensed by an ambient air temperature sensor 40, the temperature of the exhaust gas exiting the engine 2 is sensed by an exhaust gas temperature sensor 15. The exhaust gas pressure upstream from the DPF 8 is sensed by a pressure sensor 16*a*, the exhaust gas pressure downstream from the DPF 8 is sensed by a pressure sensor 16*b* and the temperature of the DPF 8 is sensed by a DPF temperature sensor 17.

The pressure drop across the EGR valve 10 is sensed by a differential pressure sensor 18 and either an exhaust gas mass flow sensor 19 is used to sense the flow of exhaust gas through the EGR valve 10 or it is estimated based upon the pressure drop across the EGR valve 10.

A driver torque demand is sensed by the accelerator pedal position sensor 39 and ambient air temperature is sensed by the ambient air temperature sensor 40.

The outputs from the sensors 13, 14, 15, 16*a*, 16*b*, 17, 18, 19, 39 and 40 are supplied to the electronic controller 50 as control inputs.

The electronic controller 50 is arranged to control the operation of the engine 2 in order to meet a torque demand from a driver of the motor vehicle MV and to minimise fuel usage and emissions from the engine 2 during normal running in a normal run mode of operation by controlling the injection of fuel into the engine from the fuel injectors 30, the flow of air into the engine 2 via the throttle valve 7 and the mass of exhaust gas recirculated via the exhaust gas recirculation circuit.

The electronic controller 50 is also operable to operate the engine 2 in an EGR valve cleaning mode of operation in accordance with the present disclosure and in a DPF regeneration mode of operation.

In a first phase (Phase 1) of the DPF regeneration mode of operation the electronic controller 50 controls the engine 2 so as to increase the temperature of the exhaust gas exiting the engine when it is indicated that regeneration of the DPF 8 is required and suitable conditions for regenerating the DPF 8 are present. Many techniques exist for establishing when regeneration of a DPF is required but in the case of this example when the difference between the exhaust gas pressure sensed by the upstream pressure sensor 16*a* and the exhaust gas pressure as sensed by the downstream pressure sensor 16*b* exceeds a predefined threshold this is inferred as an indication that regeneration of the DPF 8 is required.

During Phase 1 operation of the engine 2 the injection of fuel is delayed compared to the optimum point of injection but not to such an extent that unburnt fuel exits the engine 2. The effect of this later injection of fuel is that the fuel burns late in the power stroke so that the power produced by the combustion is less than optimal and the combustion results primarily in a rapid increase in exhaust gas temperature.

When the temperature of the DPF 8 has been increased to a predefined temperature as sensed by the temperature sensor 17 the second phase of DPF regeneration known as Phase 2 commences.

In Phase 2 the electronic controller 50 operates the engine 2 to produce a flow of unburnt hydrocarbons for combustion in the DPF 8 by using one or more late or post injections of fuel into the engine 2 that are so late that there is insufficient time for all of the injected fuel to be combusted and so excess fuel flows to the DPF 8.

The excess fuel (hydrocarbons) entering the DPF 8 auto-ignites and combusts the soot that has collected in the DPF 8 thereby regenerating the DPF 8.

It will be appreciated that such a DPF regeneration mode is well known in the art.

Typical values for the injection of fuel for a four stroke engine are, for example and without limitation:— a/ for 'Normal' engine operation a pilot injection at 10° BTDC on the compression stroke followed by a main injection at 2° ATDC in the power stroke;

b/ for 'Phase 1' operation a pilot injection at 10° BTDC in the compression stroke, and a further injection at 2° ATDC in the power stroke followed by a post injection at 20° ATDC in the power stroke; and c/ for 'Phase 2' operation, injections as per 'Phase 1' plus a further injection referred to as a late post injection at 170° ATDC in the power stroke.

Accordingly, in addition to pilot and main injections at the same or substantially the same timings as in normal engine operation, Phase 1 operation may further include a post injection during the power stroke after the main injection (e.g., at least 10° after the main injection and less than 30° after the main injection). Further, in addition to pilot, main, and post injections at the same or substantially the same timings as in Phase 1 operation, Phase 2 operation may further include a late post injection during the power stroke after the post injection (e.g., at least 100° after the post injection and less than 200° after the post injection).

The electronic controller 50 is operable to operate the engine 2 (e.g., via adjustment of one or more actuators such as throttle valve 7, engine fuel injectors, engine intake/exhaust valves, etc.) to clean the EGR valve 10 when it is indicated that fouling of the EGR valve 10 has reached either a predefined level (e.g., corresponding to a predefined quantity of combustion by-product accumulated on the EGR valve) at which cleaning is desirable in order to prevent unreliable opening and closing of the EGR valve 10 or when fouling of the EGR valve 10 has reached a critical level where malfunction of the EGR valve 10 is likely unless cleaning takes place.

As will be described in greater detail hereinafter with reference to FIGS. 3A to 3D, the electronic controller 50 includes several control modules. The control modules may include an EGR valve fouling estimator 250 that estimates the amount of EGR valve fouling that has accumulatively occurred, a valve cleaning position estimator 350 that provides an input of EGR valve position (e.g., opening amount) that will produce effective cleaning while preventing thermal damage from occurring due to the flow of hot exhaust gas through the EGR valve 10 during the cleaning operation, a DPF regeneration controller 500 that controls regeneration of the DPF 8 and decides when to regenerate the DPF 8, a normal EGR valve position controller 600 that controls the position of the EGR valve 10 when not in the cleaning mode and control logic 400 to take the inputs from the EGR valve fouling estimator 250, the valve cleaning position estimator 350, the DPF regeneration controller 500, and the normal EGR valve position controller 600 and produce a desired operation (e.g., final valve position) 700 of the EGR valve 10. Each control module may comprise a set of instructions stored in non-transitory memory of electronic controller 50, each set of instructions executable by a processor (e.g., a processor of electronic controller 50) to carry out the corresponding actions. Further, each control module may receive inputs from sensors and/or other control modules, and each control module may send signals to actuators of the vehicle and/or to other control modules.

Whenever possible the electronic controller 50 carries out cleaning of the EGR valve 10 during Phase 1 of a DPF regeneration event because this will have the least effect on engine emission and fuel economy performance. However, if the fouling is assessed as being critical and DPF regeneration is not scheduled, then the electronic controller 50 is operable to operate the engine 2 in a manner the same as or similar to that used for Phase 1 of a DPF regeneration event even though such an event is not going to take place.

Irrespective of when the cleaning of the EGR valve 10 occurs the process is the same, namely to produce a hot exhaust gas flow (e.g., an exhaust gas flow hotter than a predetermined temperature) from the engine 2 that has a very low unburnt hydrocarbon content (e.g., a hydrocarbon content lower than a predetermined threshold) and at least partially open the EGR valve 10 to allow the hot exhaust gas to flow through the EGR valve 10 thereby burning off any sticky residue or other residue that has collected on the valve stem and valve head of the EGR valve 10.

During the cleaning process the position of the EGR valve 10, that is to say, the amount it is open, is controlled to prevent overheating of temperature sensitive parts of the EGR valve 10. When cleaning is complete, or the temperature of the EGR valve reaches a maximum permitted temperature threshold, or Phase 2 commences, the EGR valve 10 is closed and then returned to normal operation (provided Phase 2 operation of the engine 2 is not taking place, in which case the EGR valve 10 is kept closed until the Phase 2 regeneration process has finished).

It will be appreciated that the electronic controller 50 need not be a single operational unit as shown in FIG. 2, but could instead be a number of electronic units that communicate with one another to perform the above referred to tasks.

Referring now to FIGS. 3A to 3D there is shown various operational components of the electronic controller 50.

Figure 3A:
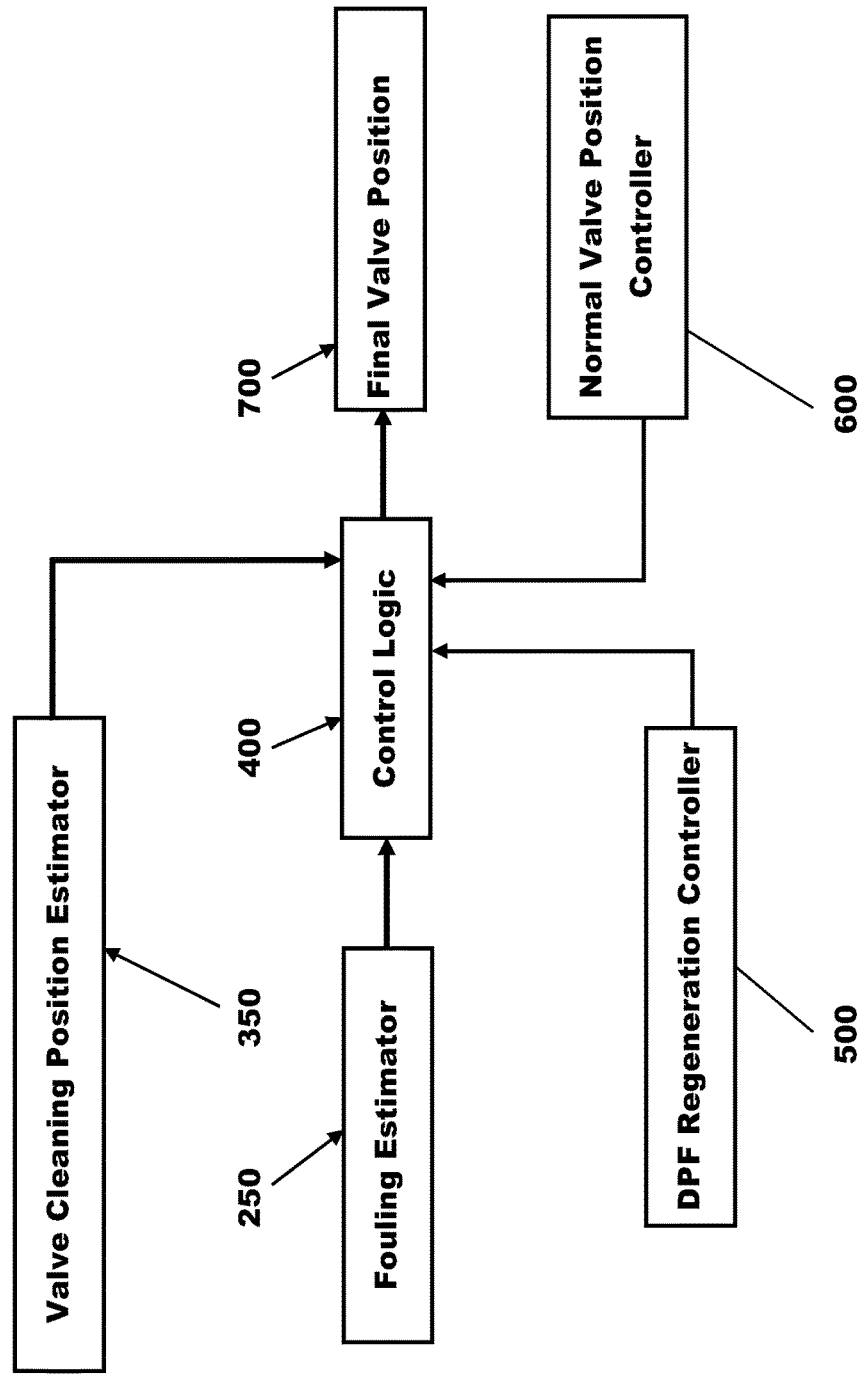
FIG. 3A is a high level schematic representation showing various components of a cleaning control system for use in cleaning the EGR valve forming part of the engine system shown in FIG. 2.

In FIG. 3A the overall operation of the electronic controller 50 required to effect cleaning of the EGR valve 10 is shown. As previously referred to, the EGR valve fouling estimator 250 provides an input indicative of accumulated fouling to control logic 400 forming part of the electronic controller 50. The control logic 400 also receives an input from the valve cleaning position estimator 350, the DPF regeneration controller 500, and the normal EGR valve position controller 600. The control logic 400 uses these inputs to produce a desired final EGR valve position output 700 which is used to control the actuator of the EGR valve 10.

Figure 3B:
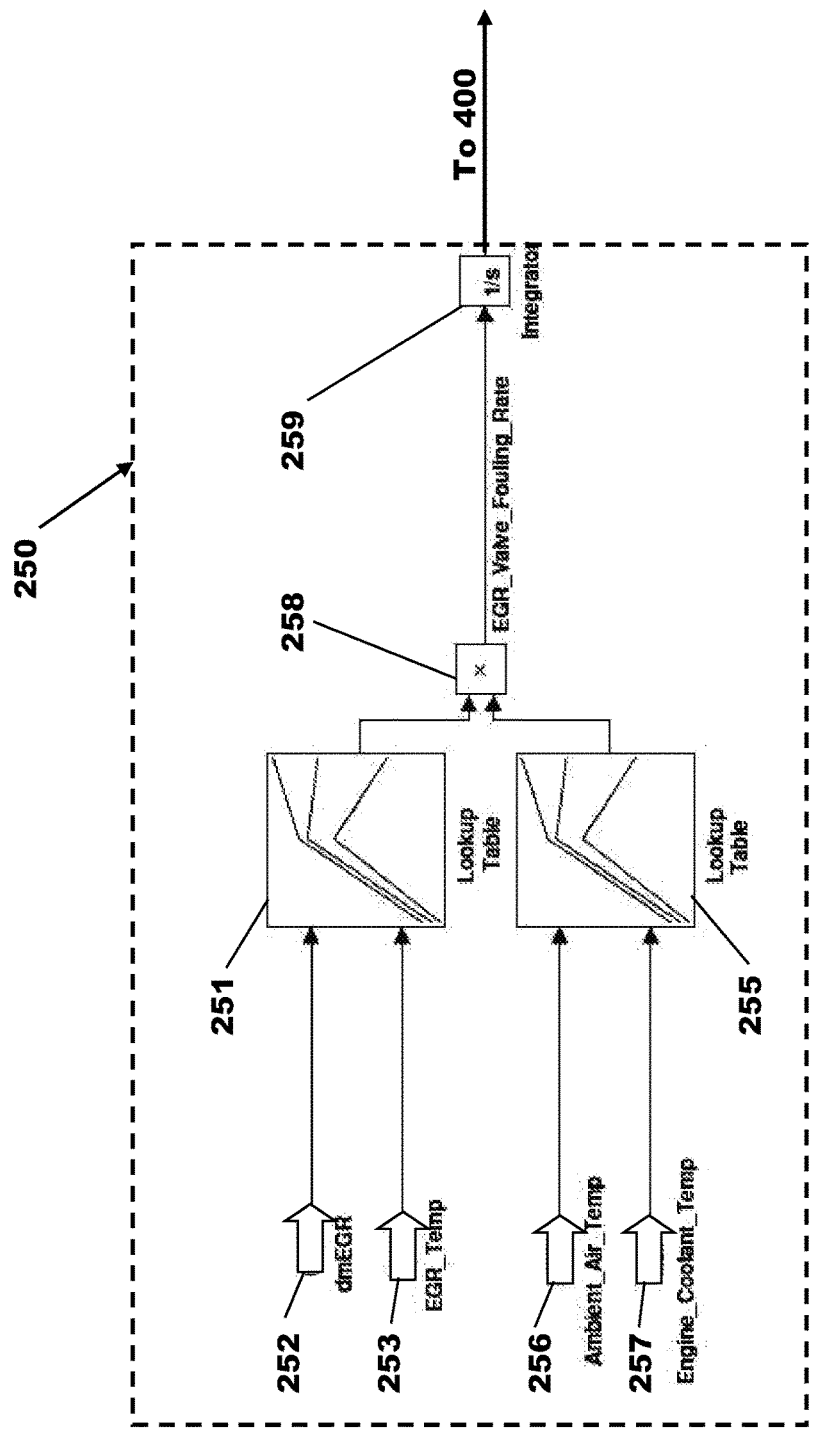
FIG. 3B is schematic representation showing in more detail an EGR valve fouling estimator component of the cleaning control system shown in FIG. 3A.

The EGR valve fouling estimator 250 is shown in greater detail in FIG. 3B and comprises first and second look up tables 251 and 255, a multiplication unit 258, and an integrator 259. The first and second look up tables may be stored in non-transitory memory of the electronic controller. Similarly, the multiplication unit and the integrator may each comprise a set of instructions stored in non-transitory memory of the electronic controller and executable by a processor to carry out their respective functions.

The first look up table 251 references exhaust gas recirculation mass flow (dmEGR) against recirculated exhaust gas flow temperature (EGR_Temp). An input 252 indicative of exhaust gas mass flow through the EGR valve 10 is provided from the exhaust gas mass flow sensor 19 and an input 253 indicative of recirculated exhaust gas temperature is in the case of this example provided from the exhaust gas temperature sensor 15. In other examples the exhaust gas mass flow through the EGR valve 10 can be calculated or modelled based upon various operating parameters of the engine.

The second look up table 255 references ambient air temperature (Ambient_Air_Temp) against engine coolant temperature (Engine_Coolant_Temp). An input 256 indicative of ambient air temperature is provided from the ambient air temperature sensor 40 and an input 257 indicative of engine coolant temperature is provided from the engine coolant temperature sensor 14.

Values derived from the first and second look up tables are combined in the multiplication unit 258 to produce an EGR valve fouling rate (EGR_Valve_Fouling_Rate). It will be appreciated that the multiplication unit 258 may be embodied as software or firmware as part of the electronic controller 50.

The EGR valve fouling rate (EGR_Valve_Fouling_Rate) is fed into the integrator 259 to produce an accumulated value of EGR valve fouling factor 'F' (EGR_Valve_Fouling_Estimate) indicative of EGR valve fouling that is supplied as an input to the control logic 400 component of the electronic controller 50.

Figure 3C:
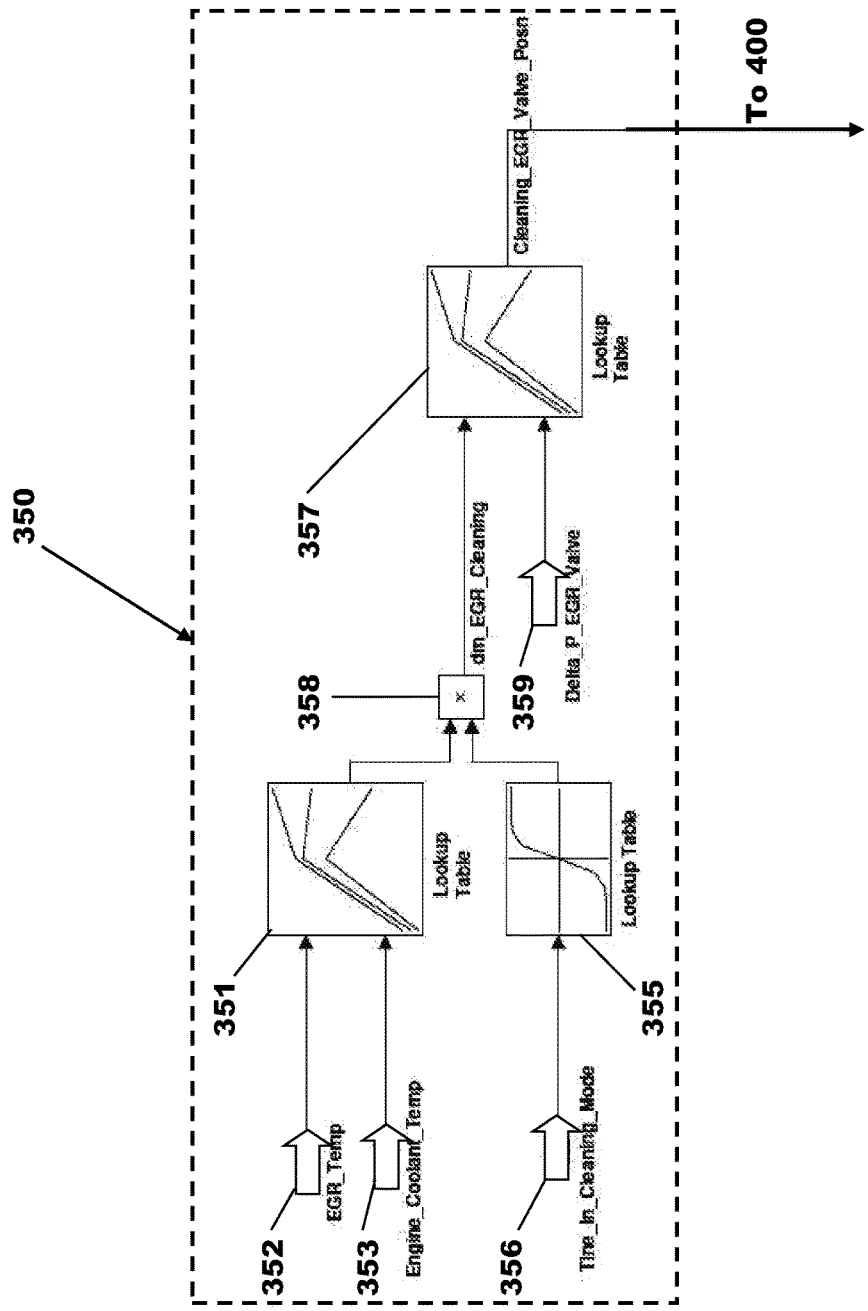
FIG. 3C is schematic representation showing in more detail an EGR valve position estimator component of the cleaning control system shown in FIG. 3A.

Referring now to FIG. 3C there is shown in more detail the valve cleaning position estimator 350 that is used to control the opening and closing of the EGR valve 10 during cleaning to prevent thermal damage occurring to the EGR valve 10.

The valve cleaning position estimator 350 comprises first, second, and third look up tables 351, 355, and 357 and a multiplication unit 358. The first, second, and third look up tables may be stored in non-transitory memory of the electronic controller. Similarly, the multiplication unit may comprise a set of instructions stored in non-transitory memory of the electronic controller and executable by a processor to carry out multiplication.

The first look up table 351 references recirculated exhaust gas flow temperature (EGR_Temp) against engine coolant temperature (Engine_Coolant_Temp). An input 352 indicative of recirculated exhaust gas temperature is provided from the exhaust gas temperature sensor 15 and an input 353 indicative of engine coolant temperature is provided from the engine coolant temperature sensor 14.

The second look up table 355 uses an input 356 of the time spent in the EGR valve cleaning mode (Time_In_Cleaning_Mode) to produce an output indicative of EGR valve heating using a predefined relationship between time and temperature for the EGR valve 10.

The outputs from the first and second look up tables are combined in the multiplication unit 358 to produce a value (dm_EGR_Cleaning) indicative of the desired mass flow through the EGR valve 10 during the cleaning process.

The third look up table 357 references the desired mass flow through the EGR valve 10 during the cleaning process (dm_EGR_Cleaning) against an input 359 indicative of the pressure difference across the EGR valve 10 derived from the differential pressure sensor 18 (Delta_P_EGR_Valve). The third look up table 357 provides a value (Cleaning_EGR_Valve_Posn) for the position of the EGR valve 10 during the cleaning process that is supplied to the control logic 400.

Figure 3D:
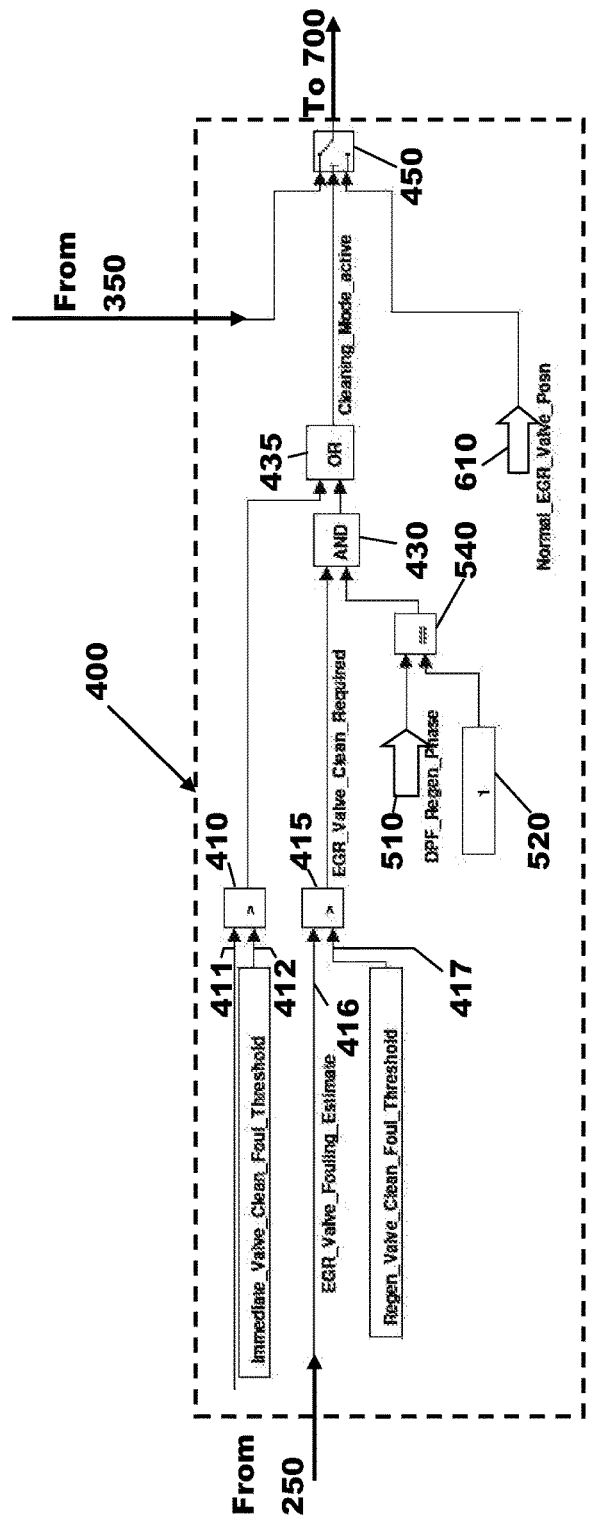
FIG. 3D is schematic representation showing in more detail a control logic component of the cleaning control system shown in FIG. 3A.

Referring now to FIG. 3D the operation of the control logic 400 will be described in greater detail.

The output of the fouling factor 'F' (EGR_Valve_Fouling_Estimate) from the fouling estimator 250 that is indicative of accumulated EGR valve fouling is supplied as a pair of inputs 411, 416 to a pair of comparators 410, 415 respectively.

The first comparator 410 (equals box 125 on FIG. 1) compares the fouling factor 'F' to a predefined value $F_{max}$ (Immediate_Valve_Clean_Foul_Threshold) that is set to a value where immediate cleaning of the EGR valve 10 is required because the amount of fouling is critical (e.g., greater than a predetermined threshold).

An output of 1=Yes 0=No from the comparator 410 is supplied to a logical operator 'OR' function indicated as 435. 'Yes' indicates that immediate cleaning is required and 'No' indicates that immediate cleaning is not required.

The second comparator 415 (equivalent to box 130 on FIG. 1) compares 'F' to a predefined limiting value $F_{Lim}$ (Regen_Valve_Clean_Foul_Threshold) that is set to a value where cleaning of the EGR valve 10 can be deferred until the next DPF regeneration occurs.

An output of 1='Yes' 0='No' from the comparator 415 is supplied to a logical operator 'AND' function indicated as 430. Where 'Yes' indicates that cleaning is required (EGR_Valve_Clean_Required) and 'No' indicates that cleaning is not currently required.

The logical operator 'AND' 430 also receives an input from a regeneration state assessor 540 indicative of whether Phase 1 regeneration of the DPF 8 is occurring. The regeneration state assessor 540 is arranged to receive from the DPF regeneration controller 500, an input 510 indicative of whether DPF regeneration is active (DPF_Regen_Phase), and an input 520 indicating whether the regeneration is currently in Phase 1 or Phase 2.

If the output from the regeneration state assessor 540 indicates that regeneration is occurring and that Phase 1 is active then a '1' input is provided to the logical operator 'AND' 430 otherwise a '0' input is provided to the logical operator 'AND' function 430.

If the two inputs received by the logical operator 'AND' function 430 are both '1' then a '1' output is provided to the logical operator 'OR' function 435 otherwise a '0' is provided to the logical operator 'OR' function 435.

If either of the outputs from the comparator 410 or the logical operator 'AND' function 430 received by the logical operator 'OR' function 435 are '1' then a '1' output is sent to a switch 450 otherwise a '0'output will result.

A '1' output from the 'OR' function 435 indicates that cleaning is required, that is to say, EGR valve cleaning mode is active (Cleaning_Mode_active). If a '0' results from the 'OR' function then EGR valve cleaning mode is not active.

The switch 450 receives in addition to an input from the 'OR' function 435 an input from the valve cleaning position estimator 350 and an input 610 indicative of normal EGR valve position (Normal_EGR_Valve_Posn) from the normal valve position controller 600.

When the input to the switch 450 from the 'OR' function is '1' the input from the valve cleaning position estimator 350 is selected (as shown in FIG. 3D) to control the position of the EGR valve 10 and is used as the final valve position 700. However, if the input to the switch 450 from the 'OR' function is '0' indicating that cleaning is not active then the switch 450 selects the input 610 as the final position 700 of the EGR valve 10.

Cleaning of the EGR valve 10 will occur automatically if the engine 2 is being run by the electronic controller 50 in the hot exhaust mode, as all that is required is for the EGR valve 10 to be at least partially opened when there is a flow of hot exhaust gas from the engine 2 for combustion of the sticky residue to take place.

Although the present disclosure is particularly advantageous in the context of a diesel engine, it will be appreciated that it could be applied with benefit to a direct injection gasoline engine having a downstream particulate filter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements.

Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of cleaning an exhaust gas recirculation valve forming part of an engine system having an engine arranged to supply exhaust gas to a particulate filter, an exhaust gas recirculation circuit including the exhaust gas recirculation valve to selectively recirculate exhaust gas back from an exhaust side of the engine to an air inlet side of the engine, and an electronic controller to control the operation of the engine system, wherein the method comprises producing an estimate of accumulated combustion by-product fouling of the exhaust gas recirculation valve, comparing the estimate of combustion by-product fouling to a predefined fouling limit and, if the estimate of combustion by-product fouling is greater than the predefined fouling limit, operating the engine to increase a temperature of the exhaust gas from the engine while producing a flow of exhaust gas having a an unburnt hydrocarbon content below a threshold, and controlling the exhaust gas recirculation valve during a cleaning period to allow the exhaust gas from the engine to flow through the exhaust gas recirculation valve thereby reducing a quantity of combustion by-products accumulated at the exhaust gas recirculation valve.

2. The method as claimed in claim 1, wherein there are lower and upper predefined fouling limits, the method further comprising, responsive to the estimate of combustion by-product fouling exceeding the lower limit, adjusting operation of the engine system to clean the exhaust gas recirculation valve in order to reduce the probability of unreliable operation of the exhaust gas recirculation valve.

3. The method as claimed in claim 2, further comprising operating the engine system in a first mode in which the estimate of combustion by-product fouling is greater than the upper limit, and during operation in the first mode, adjusting operation of the engine system to increase the temperature of the exhaust gas from the engine and produce a flow of exhaust gas having an unburnt hydrocarbon content below the threshold, and at least partially opening the exhaust gas recirculation valve to allow exhaust gas from the engine to flow through the exhaust gas recirculation valve.

4. The method as claimed in claim 3, further comprising operating the engine system in a second mode in which the estimate of combustion by-product fouling is greater than the lower limit but less than the upper limit, and during operation in the second mode, waiting until a particulate filter regeneration event commences, and then adjusting operation of the engine system to increase the temperature of the exhaust gas from the engine while producing a flow of exhaust gas having an unburnt hydrocarbon content lower than the threshold, and controlling the exhaust gas recirculation valve to allow the exhaust gas from the engine to flow through the exhaust gas recirculation valve.

5. The method as claimed in claim 4, further comprising closing the exhaust gas recirculation valve responsive to one of the flow of exhaust gas having an unburnt hydrocarbon content below the threshold ceasing, an updated estimate of the combustion by-product fouling of the exhaust gas recirculation valve indicating that a level of fouling is below a predefined fouling threshold, and reaching a maximum permitted temperature threshold of the exhaust gas recirculation valve.

6. The method as claimed in claim 5, wherein the predefined fouling threshold is a level of fouling at which the quantity of combustion by-products accumulated at the exhaust gas recirculation valve is substantially equal to zero.

7. The method as claimed in claim 1, wherein estimating the accumulated combustion by-product fouling of the exhaust gas recirculation valve comprises integrating a rate of fouling of the exhaust gas recirculation valve over time.

8. The method as claimed in claim 7, wherein the rate of fouling of the exhaust gas recirculation valve is determined based upon a relationship between an exhaust gas mass flow through the exhaust gas recirculation valve and a temperature of the exhaust gas flowing through the exhaust gas recirculation valve and further based on a relationship between an ambient air temperature and an engine coolant temperature during a time period that exhaust gas is flowing through the exhaust gas recirculation valve.

9. The method as claimed in claim 8, wherein the relationship between the exhaust gas mass flow through the exhaust gas recirculation time and the temperature of the exhaust gas flowing through the exhaust gas recirculation valve is provided by way of a look up table stored in non-transitory memory of the electronic controller.

10. The method as claimed in claim 8, wherein the relationship between the ambient air temperature and the engine coolant temperature during the time period that exhaust gas is flowing through the exhaust gas recirculation valve is provided by way of a look up table stored in non-transitory memory of the electronic controller.

11. The method as claimed in claim 1, wherein controlling the exhaust gas recirculation valve during the cleaning period comprises determining an exhaust gas recirculation valve position based upon a relationship between an exhaust gas mass flow through the exhaust gas recirculation valve during the cleaning period and a pressure difference across the exhaust gas recirculation valve, and adjusting the exhaust gas recirculation valve to the determined position.

12. The method as claimed in claim 11, wherein the relationship between the exhaust gas mass flow through the exhaust gas recirculation valve during the cleaning period and the pressure difference across the exhaust gas recirculation valve is provided by way of a look up table stored in non-transitory memory of the electronic controller.

13. The method as claimed in claim 11, wherein the exhaust gas mass flow through the exhaust gas recirculation valve during the cleaning period is determined based upon a relationship between a temperature of the exhaust gas flowing through the exhaust gas recirculation valve and an engine coolant temperature and further based on a relationship between time and an exhaust gas recirculation valve temperature during the cleaning period.

14. The method as claimed in claim 13, wherein the relationship between the temperature of the exhaust gas flowing through the exhaust gas recirculation valve and the engine coolant temperature is provided by way of a look up table stored in non-transitory memory of the electronic controller.

15. The method as claimed in claim 13, wherein the relationship between time and the exhaust gas recirculation valve temperature during the cleaning period is provided by way of a look up table stored in non-transitory memory of the electronic controller.

16. An engine system comprising an engine arranged to supply exhaust gas to a particulate filter, an exhaust gas recirculation circuit including an exhaust gas recirculation valve to selectively recirculate exhaust gas from an exhaust outlet side of the engine to an air inlet side of the engine, and an electronic controller to control the operation of the engine and the exhaust gas recirculation valve, wherein the electronic controller includes instructions stored in non-transitory memory which are executable by a processor to produce an estimate of accumulated combustion by-product fouling of the exhaust gas recirculation valve based upon inputs received from a plurality of sensors, compare the estimate of combustion by-product fouling to a predefined fouling limit stored in the non-transitory memory of the electronic controller, and if the comparison indicates that the estimate of combustion by-product fouling is greater than the predefined fouling limit, clean the exhaust gas recirculation valve by operating the engine to increase a temperature of the exhaust gas from the engine while producing a flow of exhaust gas having an unburnt hydrocarbon content less than a threshold, and to control the exhaust gas recirculation valve during a cleaning period to allow exhaust gas from the engine to flow through the exhaust gas recirculation valve thereby reducing a quantity of combustion by-products accumulated at the exhaust gas recirculation valve.

17. The engine system as claimed in claim 16, wherein there are lower and upper predefined fouling limits, and wherein the lower limit is a fouling limit above which cleaning of the exhaust gas recirculation valve is performed in order to reduce a probability of unreliable operation of the exhaust gas recirculation valve.

18. The engine system as claimed in claim 17, wherein the electronic controller further comprises instructions stored in the non-transitory memory and executable by the processor to operate the engine system in a first mode in which the estimate of combustion by-product fouling is greater than the upper limit, and during operation in the first mode, adjust operation of the engine system to increase the temperature of the exhaust gas from the engine and produce a flow of exhaust gas having an unburnt hydrocarbon content below the threshold, and control the exhaust gas recirculation valve to allow exhaust gas from the engine to flow through the exhaust gas recirculation valve.

19. The engine system as claimed in claim 17, wherein the electronic controller further comprises instructions stored in the non-transitory memory and executable by the processor to operate the engine system in a second mode in which the estimate of combustion by-product fouling is greater than the lower limit but lower than the upper limit, and during operation in the second mode, wait until a particulate filter regeneration event commences, and then adjust operation of the engine system to increase the temperature of the exhaust gas from the engine while producing a flow of exhaust gas having an unburnt hydrocarbon content lower than the threshold, until a particulate filter regeneration event commences, and when the particulate filter regeneration event commences, at least partially open the exhaust gas recirculation valve to allow exhaust gas from the engine to flow through the exhaust gas recirculation valve.

20. The engine system as claimed in claim 18, wherein the electronic controller further comprises instructions stored in the non-transitory memory and executable by the processor to close the exhaust gas recirculation valve if one of the flow of exhaust gas having the unburnt hydrocarbon content less than the threshold ceases, an updated estimate of the accumulated combustion by-product fouling of the exhaust gas recirculation valve indicates that a level of fouling is below a predefined fouling threshold, and a maximum permitted temperature threshold of the exhaust gas recirculation valve is reached.

21. The engine system as claimed in claim 20, wherein the predefined fouling threshold is a level of fouling at which the quantity of combustion by-products accumulated at the exhaust gas recirculation valve is substantially equal to zero.

22. The engine system as claimed in claim 16, wherein the estimate of combustion by-product fouling of the exhaust gas recirculation valve is an integral of a rate of fouling of the exhaust gas recirculation valve over time.

23. The engine system as claimed in claim 16, wherein controlling the exhaust gas recirculation valve during the cleaning period comprises determining an exhaust gas recirculation valve position based upon a relationship between an exhaust gas mass flow through the exhaust gas recirculation valve during the cleaning period and a pressure difference across the exhaust gas recirculation valve, and adjusting the exhaust gas recirculation valve to the determined position.

24. The engine system as claimed in claim 23, wherein the relationship between the exhaust gas mass flow through the exhaust gas recirculation valve during the cleaning period and the pressure difference across the exhaust gas recirculation valve is provided by way of a look up table stored in non-transitory memory of the electronic controller.

25. The engine system as claimed in claim 16, wherein the engine is a diesel engine and the particulate filter is a diesel particulate filter.

26. A motor vehicle having an engine system as claimed in claim 16.

* * * * *